Oct. 1, 1963
D. E. KRUP
3,105,616
SOUP OR BEVERAGE DISPENSER
Filed Oct. 10, 1960
2 Sheets-Sheet 1
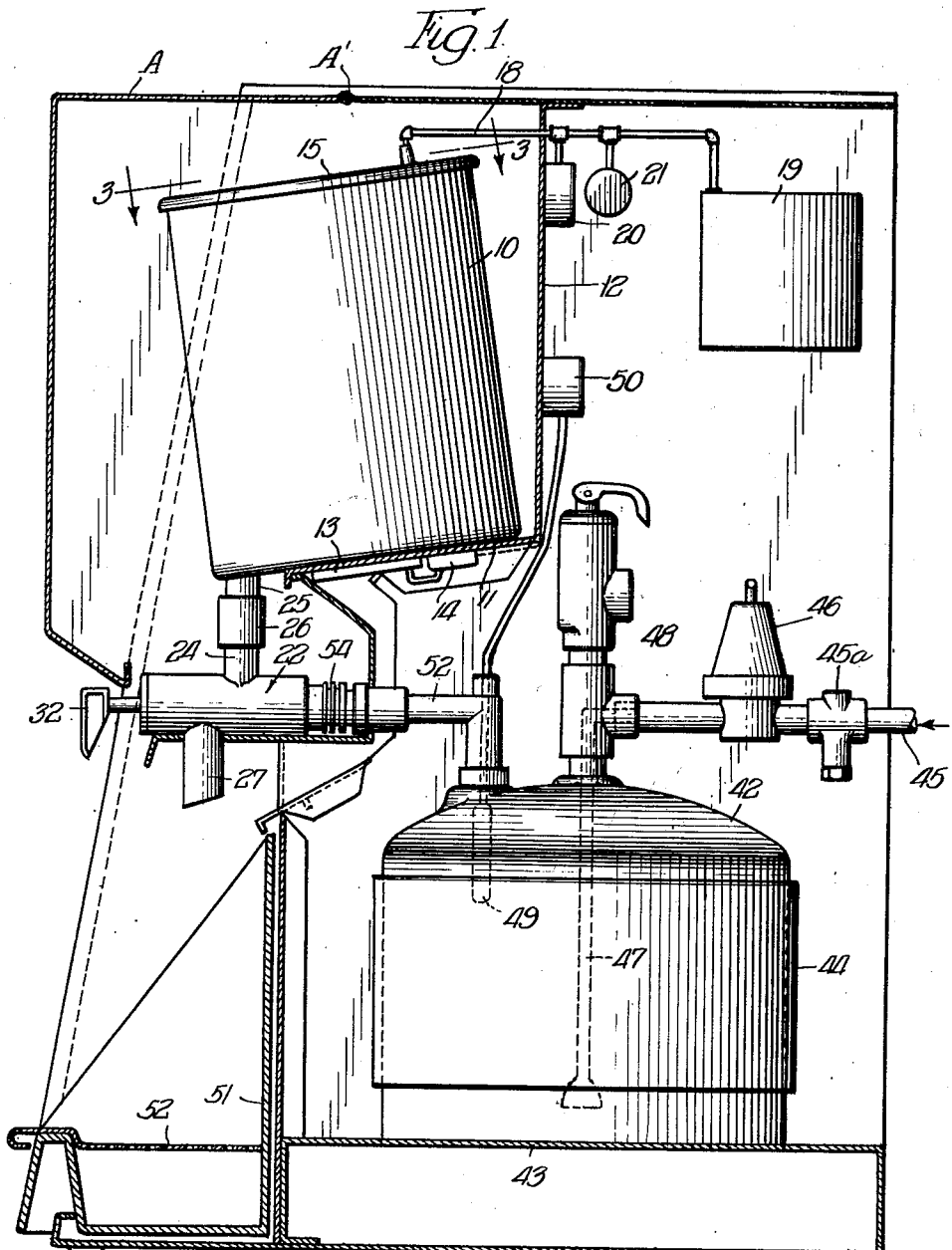
INVENTOR.
Donald E. Krup,
BY
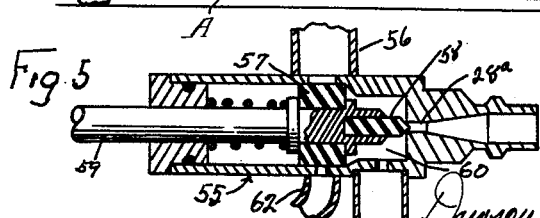
attys Oct. 1, 1963 D. E. KRUP 3,105,616
SOUP OR BEVERAGE DISPENSER
Filed Oct. 10, 1960 2 Sheets-Sheet 2
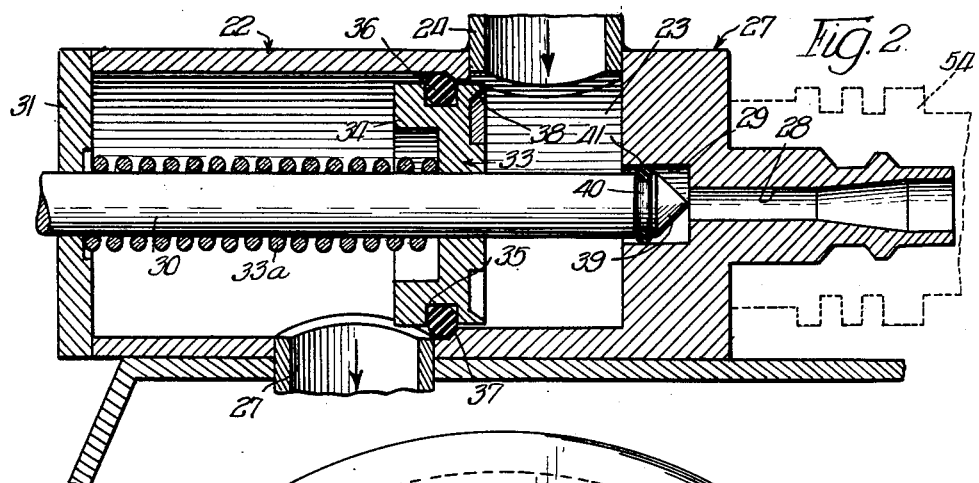
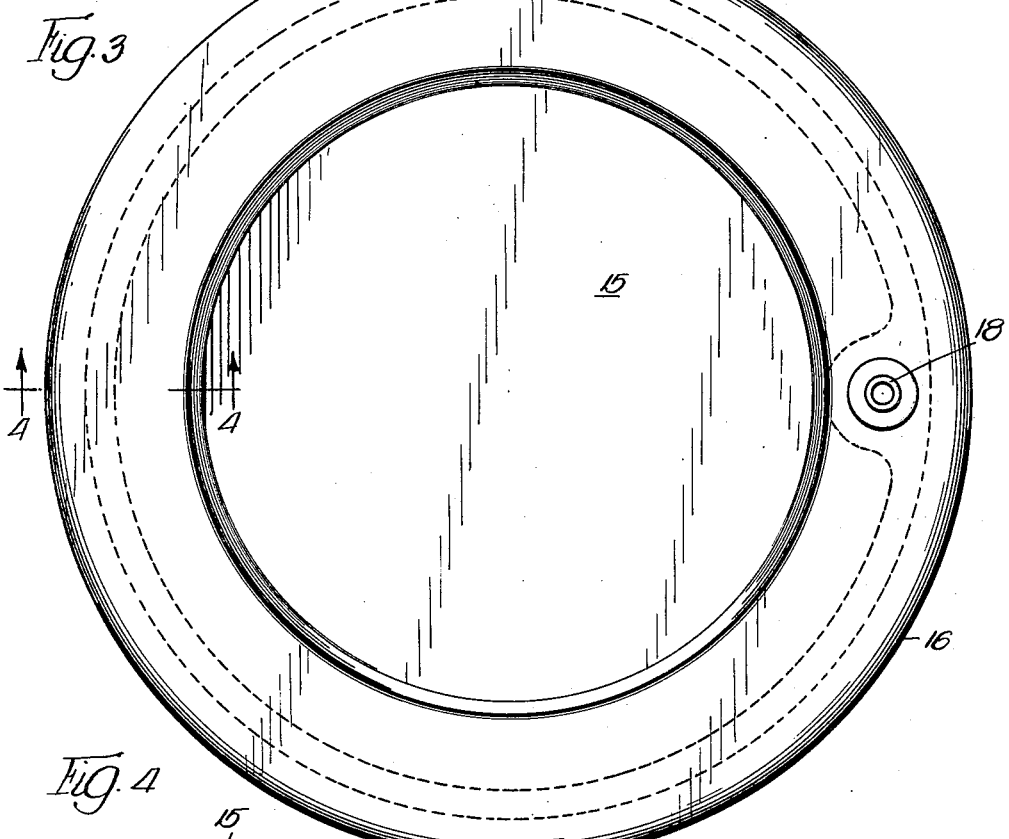
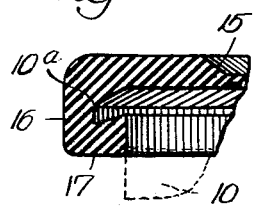
INVENTOR.
Donald E. Krup,
BY
Dawson, Tilton, Fallon & Lungmus

United States Patent Office 3,105,616
Patented Oct. 1, 1963

3,105,616
SOUP OR BEVERAGE DISPENSER
Donald E. Krup, Elgin, Ill., assignor to The Fred Mills Corporation, Elgin, Ill., a corporation of Illinois
Filed Oct. 10, 1960, Ser. No. 61,554
7 Claims. (Cl. 222—129.2)

This invention relates to a soup or beverage dispenser, and is particularly useful in the dispensing of a fluid concentrate containing solids, such as soup, while also being useful in the dispensing of beverage liquids.

In the dispensing of a soup material containing starches and solid ingredients, such as tomato pieces, meat pieces, etc., a substantial problem is encountered because of the difficulty of obtaining quick and thorough mixing of hot water with the concentrate material, bringing the starch particles into solution, and providing a complete soup product in the short interval of time afforded in the dispensing operation, while at the same time during the dispensing operation continuously mixing the ingredients in the desired relative proportions. Further, the solid materials render sealing of the valve openings difficult. A further problem is to prevent dilution of the concentrate in the reservoir while a portion of the concentrate to be dispensed is being admixed with hot water for dispensing, while also preventing undesirable pulsations from changing the flow rate of the concentrate during the pressure conditions necessary for the dispensing of the soup or other final product.

An object of the present invention is to provide apparatus and means for overcoming the above difficulties. Another object is to provide apparatus in which a reservoir of soup or beverage concentrate is maintained in undiluted condition while at the same time feeding increments or portions thereof into a mixing chamber for quick and thorough mixing with water to obtain a final complete soup or beverage product. A further object is to provide in a dispenser apparatus means for creating high turbulence and thorough mixing in a mixing chamber, causing starches and other difficultly soluble materials to go into solution. Yet another object is to provide valve means having sharp edge portions adapted to insure complete seating of the valve and the closure of the outlet port. A still further object is to provide soup or beverage-forming and dispensing apparatus compactly housed for forming and dispensing the products while at the same time providing parts which may be readily disassembled for cleaning and readily assembled after cleaning. Other specific objects and advantages will appear as the specification proceeds.

The invention is shown, in an illustrative embodiment, by the accompanying drawings, in which—

FIGURE 1 is a vertical side view in elevation with the casing shown in section and setting out apparatus which may be employed in the practice of my invention; FIG. 2, an enlarged longitudinal sectional view of a dispensing casing means which may be employed for the mixing of concentrate with hot water and the dispensing of the product; FIG. 3, a top plan view of the concentrate container and the flexible lid therefor; FIG. 4, a detail sectional view, the section being taken as indicated at line 4—4 of FIG. 3; and FIG. 5, a sectional view showing a modified form of valve structure.

In the illustration given, A designates a housing which may be of any suitable construction and which provides support for the parts which will now be described; and A' designates a hinge providing for ready access to the interior of the housing.

The concentrate container 10 is supported upon a shelf 11 suspended by partition 12 secured to the top of casing A. The support 11 may also carry an electric resistance heater 13 and a thermostat 14 for maintaining a desired temperature for the concentrate within the container 10. The container 10 is provided at its top with a laterally-extending flange 10a, as shown more clearly in FIG. 4, and a flexible container lid 15 formed of rubber, synthetic rubber, or other flexible material, is provided with a depending skirt 16 provided with an inwardly-extending ledge 17 adapted to engage the flange 10a. When gaseous pressure is exerted within the container 10, the upward flexing of the lid 15 causes the ledge 17 to tightly grip the bead or flange portion 10a. When, however, the pressure is released and the lid 15 flexes downwardly, it is easy to remove the lid from engagement with the flange 10a of container 10.

In operating the concentrate container 10, I prefer to maintain a low gaseous pressure upon the concentrate, and any suitable means may be employed for this purpose. In the illustration given, an air line 18 communicates with the top of the lid 15 and extends to an air pump 19 which may be of any well known type or construction. An air pressure gauge 20 communicates with the air line 18, and a pressure-responsive control switch 21 is provided for the usual function of keeping the pressure at a desired level. Since all of such apparatus is well known, it is believed that a detailed description herein is unnecessary. While the pressure exerted by air or other gas upon the top surface of the concentrate in the reservoir or container 10 may vary depending upon the type of concentrate being discharged, I find that a pressure of about ¾ of a pound is satisfactory for most products, such as soups and beverages.

Spaced below the container 10 is a dispenser casing 22. The dispenser casing 22 has therein a concentrate chamber 23 which is maintained in open communication with the container 10 by means of an inlet pipe 24 extending into the inlet of casing 22 and an outlet pipe 25 extending downwardly from container 10 and a plastic connector tube 26 which joins pipes 24 and 25.

The dispenser casing 22 is also provided with an outlet equipped with a discharge pipe or nozzle 27 near one end of the casing and at the other end of the casing is equipped with a hot water jet inlet passage 28 which opens into an enlarged valve passage 29. This passage, in the form of a venturi, supplies the high velocity stream aligned with the spreader head 39 for aspirating concentrate from the reservoir and for producing high turbulence in the mixing chamber.

A valve stem 30 extends through a closure 31 at the outer end of the casing 22 and is equipped at its outer end with an operating knob or handle 32. Secured to the stem 30 at an intermediate point is a valve 33 having a barrel portion 34 recessed at 35 to receive the sealing rings 36. When the valve is in closed position, the sealing rings bear against a valve seat or shoulder 37 provided by the dispenser casing 22. A spring 33a normally urges the valve stem inwardly.

In the dispensing of soup and similar products in which solid materials are carried, it is possible for the solid materials to block the seating of the valve, and to overcome this difficulty I provide the valve 33 with sharpened peripheral edges 38 at the forward end of the valve, as shown more clearly in FIG. 2.

The forward end of the valve stem terminates in a spreader cone 39 which is supported in axial alignment with the inlet jet passage 28 so that the incoming hot water under relatively high pressure impinges upon the cone and is directed laterally toward the side walls of the casing chamber, tending to seal the concentrate within the chamber 23 momentarily as it is being agitated and thoroughly mixed with the hot water. The stem 30 is provided with a channel 40 at the rear of the cone 39 and a resilient sealing ring 41 is held within the channel.

Any suitable means for supplying hot water under pressure to the jet inlet 28 may be employed. In the illustration given, a hot water tank 42 is supported within the casing upon a raised platform 43, as shown more clearly in FIG. 1, and the tank is enclosed with a heating cylinder 44 provided with electric resistance elements (not shown). Water from a main under pressure is supplied through the water line 45 and strainer 45a, and the pressure is reduced to a desired operating pressure (preferably about 14 lbs.) by the pressure regulator 46. The water passes inwardly into the tank and downwardly through the tube 47. A safety valve 48 is provided at the top of the tank 42. A thermostat bulb 49 extends downwardly into the water in the tank and operates a thermal control switch 50 for regulating the heating elements of the cylinder 44. The temperature of the water in the tank is preferably maintained at about 205° F., but the temperature may be varied within substantial limits depending upon the character of the product being formed. The temperature of the concentrate in container 10 may be maintained at about 80° F., although for certain products it may be desirable to maintain the temperature between 130° and 150° F. as a safeguard against the growth of bacteria.

Below the discharge nozzle 27 I provide a drain tray 51 which seats upon the housing A and is provided with a perforated drain shelf 52.

Hot water from the tank 42 is conveyed to the jet inlet 28 by means of a conduit 53 provided with a quick disconnect connection 54.

*Operation*

In the operation of the apparatus, the reservoir 10 is filled with concentrate, such as, for example, soup concentrate, the lid 15 being removed to open the container 10, and then, after filling, being replaced in closed position with the ledge 17 engaging the rim 10a of the container 10, as shown best in FIG. 4. Pressure is then supplied by the air pump 19, causing the lid to flex upwardly and to form a tight seal about the rim 10a of container 10. A pressure of about three-fourth of a pound is found to give an effective seal while also providing a pressure upon the concentrate for effective feeding during the dispensing operations.

When the concentrate is to be dispensed, the vessel is placed on the drain lid 52 and the handle 32 is drawn outwardly. In this operation, the resilient valve sealing rings 36 and 41 are moved outwardly, opening the nozzle 27 and then releasing hot water through the jet 28. As the spreader head or cone 39 moves outwardly, the hot water under a pressure of about 14 pounds carries through the concentrate against the cone, driving the hot water and concentrate outwardly and substantially enclosing the concentrate in a turbulent mass temporarily within the area of the chamber 23. During this interval, the hot water breaks up and dissolves starch in the soup concentrate and thoroughly heats the concentrate in the chamber and mixes with it to the desired dilution for the final soup product.

Even though the outlet 27 is open, the spreader cone cooperates with the hot water jet in limiting flow of the concentrate and of the incoming concentrate against discharge until there is a thorough mixing of each dispensed portion of the concentrate admixed with hot water. At the same time, the tubulence is substantially confined within the mixing area and there is no tendency to dilute the concentrate in the reservoir 10.

After a sufficient quantity of the soup product has been discharged, the valves are returned by spring 33a to seal the hot water jet and to close communication of nozzle 27 with chamber 23. In the latter operation, the sharp peripheral edge 38 of the valve 33 cuts through any solid material so as to enable the resilient sealing ring 36 to seat effectively against the valve seat 37. Further, in this operation, the valve ring 41 at the forward end of the valve steam 30 seats within the casing 29 prior to the seating of the valve ring 36, so that the hot water flow is closed off prior to the sealing of the valve ring 36 and thus prevents excess dilution of the concentrate within the chamber 23.

In all of the foregoing operations, the concentrate chamber 23 in the dispensing casing 22 is maintained in open communication with the concentrate in container 10, and the flow of the concentrate is effective in preventing dilution of the concentrate maintained in the reservoir 10. During the dispensing operation, the dilution is limited to the concentrate within the casing 22 and the spreader cone 39 not only creates a turbulence limited within this chamber, but also the action of the flow creates a venturi-like suction upon the concentrate above to further assist it to move into the mixing chamber of casing 22. The dispensing of the hot soup is faster than the usual hand-filling operation while at the same time the served portions have greater consistency and uniformity of content.

In the foregoing operation, it is found that the flexing lid 15 performs an important function in bringing about uniform feeding of concentrate. While the air pump 19 creates pulsations and there is a temporary dropping of pressure within the container 10 as concentrate is withdrawn, it is found that the flexing lid dampens such pulsations by flexing inwardly to fill the space as concentrate is withdrawn and then flexing outwardly as the pressure is restored by the action of pump 19.

The apparatus is arranged for quick accessibility to the parts and particularly to the parts bearing food materials which require cleaning. The container 10 may be separated from the dispenser casing 22 by moving the plastic tube 26 upwardly. The dispenser casing 22 can be disconnected at 54 and all of these parts removed, cleaned and replaced. The other parts of the mechanism which do not require such constant cleaning are still readily accessible for repair and change of controls, etc.

In the modification shown in FIG. 5, the casing 55 is provided with an inlet 56 which is normally sealed by a valve 57. The water jet inlet 28a is normally sealed by a rubber or resilient valve 58. The sealing valve 58 is provided at its forward end with a cone against which the water stream inpinges when valve 59 is retracted to open the water jet inlet 28a and the inlet 56.

By way of example, when the valve 55 is used for dispensing chocolate, the concentrate flows through pipe 56 into the mixing chamber 60 when the valve 57 is retracted. The hot water leaving jet 28a under pressure strikes the cone face of valve 58, forming a momentary closure of the outlet or dispensing pipe 61 while at the same time admixing the chocolate concentrate, and thereafter the mixed beverage is discharged through pipe 61. 62 designates a tube leading to a source of air pressure for introducing air into the casing. Thus, when the valve 57 is retracted, the air inlet communicates with the mixing chamber to provide additional means for rapid agitation of the mixture.

While, in the foregoing specification, I have set forth a specific structure in considerable detail for the purpose of illustrating an embodiment of the invention, it will be understood that such details of structure may be varied widely by those skilled in the art without departing from the spirit of my invention.

I claim:

1. In liquid dispensing apparatus, a housing, a concentrate container supported in said housing and equipped with a peripheral flange at its top, a flexing lid having a wide skirt engaging said flange, air pressure means for supplying air under pressure to said concentrate container, a dispenser casing providing the concentrate chamber, a conduit coupling said container and chamber and defining with said chamber an inlet for concentrate, said dispenser casing being provided with a discharge outlet and a high velocity water jet inlet, a valve stem extending through said dispenser casing and equipped with spaced valves, one of said valves normally sealing said chamber from said concentrate inlet and the other of said valves sealing said high velocity water inlet with both of said valves being operative to provide simultaneous flow through said concentrate and water inlets, means for supplying water under pressure to said jet inlet, said last-mentioned valve constituting a spreader head and carried by the inner end of said valve stem in alignment with said water jet whereby, when said head is retracted centrally within said chamber to open said water jet, the water is impinged upon said head to form a curtain for breaking down the concentrate flow.

2. The structure of claim 1 in which said flexing lid is formed of resilient material having a depending skirt and an inwardly-extending ledge engaging a peripheral flange of the concentrate container to effectuate a seal when said container is internally pressurized.

3. In liquid dispensing apparatus,
a housing,
a concentrate container supported in said housing,
a dispensing casing providing an elongated mixing chamber having side and end walls,
a concentrate inlet and liquid outlet in said side walls, with said concentrate inlet being coupled to said container, a bore in one end wall of said casing defining a water inlet to said chamber,
means coupled to said bore for providing a high velocity jet at said chamber water inlet,
a valve stem mounted in said chamber for movement along the axis of said bore, said stem being equipped with a spreader head at one end for engagement with said bore in one stem position to seal said bore and in another position to provide a target for said high velocity water jet for forming curtains of water to break down the flow of concentrate entering said chamber from said concentrate inlet, and
valve means for said concentrate inlet operatively associated with said valve stem for flowing concentrate into said chamber when said valve stem is in said another position.

4. The apparatus of claim 3 in which said water inlet is in the shape of a venturi.

5. The apparatus of claim 3 in which said spreader head is in the shape of a cone.

6. The apparatus of claim 3 in which means are provided for supplying low gaseous pressure upon the body of concentrate in said container.

7. In liquid dispensing apparatus,
a housing,
a concentrate container supported in said housing,
a dispensing casing providing an elongated mixing chamber having side and end walls,
a concentrate inlet and liquid outlet in said side walls, with said concentrate inlet being coupled to said container, a bore in one end wall of said casing defining a water inlet to said chamber,
means coupled to said bore for providing a high velocity jet at said chamber water inlet,
a valve stem mounted in said chamber for movement along the axis of said bore, said stem being equipped with a spreader head at one end for engagement with said bore in one stem position to seal said bore and in another position to provide a target for said high velocity water jet for forming curtains of water to break down the flow of concentrate entering said chamber from said concentrate inlet, and
a valve element mounted on said stem and spaced from said head for sealing said concentrate inlet in said one stem position and said another stem position for admitting concentrate into said chamber.

References Cited in the file of this patent
UNITED STATES PATENTS

| | | |
|---|---|---|
| 2,732,810 | Simpson | Jan. 31, 1956 |
| 2,823,833 | Bauerlein | Feb. 18, 1958 |
| 2,888,040 | Terwilliger et al. | May 26, 1959 |
| 2,955,726 | Feldman et al. | Oct. 11, 1960 |
| 2,986,306 | Cocanouer | May 30, 1961 |
| 3,043,524 | Jokelson | July 10, 1962 |